United States Patent [19]

McCort et al.

[11] 3,717,365
[45] Feb. 20, 1973

[54] AUTOMATIC VEHICLE HITCH ASSEMBLY

[75] Inventors: John I. McCort, Monterey; Robert J. Notman, Salinas; Victor H. Carder, Carmel, all of Calif.

[73] Assignee: Cochran Western Corporation, Salinas, Calif.

[22] Filed: Oct. 19, 1970

[21] Appl. No.: 81,894

[52] U.S. Cl. .................................. 280/508, 280/408
[51] Int. Cl. ............................................... B60d 1/00
[58] Field of Search......280/504, 508, 509, 510, 400; 213/75; 172/275

[56] References Cited

UNITED STATES PATENTS

| | | | |
|---|---|---|---|
| 2,828,974 | 4/1958 | Jameson | 280/510 |
| 977,926 | 12/1910 | Boirault | 213/75 R |
| 2,153,309 | 4/1939 | Milz et al. | 280/510 X |
| 1,200,715 | 10/1916 | Edwards | 280/508 |
| 2,113,338 | 4/1938 | Wohldorf | 280/508 |
| 2,169,636 | 8/1939 | Curry | 280/508 |
| 2,420,725 | 5/1947 | Riggins | 280/510 |
| 2,478,736 | 8/1949 | Balzer | 280/508 X |
| 2,951,711 | 9/1960 | Karnath et al. | 280/508 |

FOREIGN PATENTS OR APPLICATIONS

| | | | |
|---|---|---|---|
| 438,659 | 12/1926 | Germany | 280/508 |
| 420,881 | 12/1910 | France | 213/75 R |

*Primary Examiner*—Benjamin Hersh
*Assistant Examiner*—Robert R. Song
*Attorney*—Flehr, Hohbach, Test, Albritton & Herbert

[57] ABSTRACT

A coupling device comprising a hitch assembly to be coupled with a like assembly in towing one or more trailer type vehicles. The hitch assembly includes latching structure which couples automatically upon interengagement of two assemblies with each other without requiring attendance of a person between the vehicles being coupled. Upon manually disengaging the latching structures of interengaged assemblies, the vehicles may be separated and each disengaged assembly thereafter is automatically prepared for subsequent automatic coupling with another hitch assembly. The hitch assembly also is usable with a conventional coupling and tow arrangement by manually rearranging its orientation against the urging of spring mechanism which normally hold the assembly in a position for automatic coupling.

11 Claims, 12 Drawing Figures

FIG_9

FIG_5

INVENTORS
JOHN I. McCORT
ROBERT J. NOTMAN
VICTOR H. CARDER
BY Flehr, Hohbach, Test,
Albritton & Herbert
ATTORNEYS

INVENTORS
JOHN I. McCORT
ROBERT J. NOTMAN
VICTOR H. CARDER

BY Flehr, Hohbach, Vest,
Albritton & Herbert
ATTORNEYS

AUTOMATIC VEHICLE HITCH ASSEMBLY

CROSS-REFERENCE TO RELATED APPLICATION

The hitch assembly of this invention is particularly well suited for utilization with a side tow tractor-trailer arrangement of the type disclosed and claimed in assignee's copending application Ser. No. 127,574 filed Mar. 24, 1971, entitled "Tractor-Trailer Side Tow Trailer Construction." While utilization of the subject hitch assembly with such a side tow arrangement is highly desirable, its utility with other vehicle constructions and towing arrangements also is recognized.

BACKGROUND OF THE INVENTION

1. Field of the Invention

This invention relates generally to the field of vehicle coupling devices. More particularly, this invention relates to the field of automatic hitch assemblies for coupling together two or more vehicles in a train. Still more particularly, this invention relates to automatic hitch assemblies for coupling together a towing vehicle and one or more trailers of the type designed for aircraft ground support operations, such as aircraft baggage and cargo trailers, and specifically to vehicle hitch assemblies which are automatically operable to couple together two vehicles without requiring direct human participation to effect coupling.

2. Description of the Prior Art

Heretofore, so far as is known, rapid coupling and uncoupling hitch assemblies of the type disclosed and claimed herein have been unknown, particularly in connection with ground support trailers for aircraft, such as baggage and cargo trailers. Heretofore, with such vehicles, it generally has been necessary for a person to stand between two vehicles being coupled, such as a tractor and a trailer or two trailers, and to effect some manual operation to complete such coupling. Such a procedure requires at least two persons, one driving the tractor and the other effecting the actual coupling. Thus, commonly used procedures have the inherent disadvantages of placing a person effecting the coupling between two vehicles in a position in which his safety frequently is jeopardized, and of requiring excess manpower to effect the coupling.

With the present invention, coupling is automatic, thereby freeing one person for other duties as well as eliminating injury to such person. Under the subject coupling procedure, only a tractor driver is required for hitching one vehicle to another.

While it is understood that automatic coupling devices have been known generally in the railroad art heretofore, so far as is known, the hitch assembly of the present invention, particularly with its simplified and comparatively inexpensive construction, has not been utilized heretofore in the railroad art or any other field concerned with coupling of one or more vehicles together.

SUMMARY OF THE INVENTION

This invention relates to an automatic vehicle hitch assembly. More particularly, this invention relates to a hitch assembly which may be automatically coupled with another hitch assembly, and particularly one embodying identical construction to the subject hitch assembly. Still more particularly, this invention relates to a double ended vehicle, such as a trailer, having an automatic hitch assembly at each of its opposite ends whereby the vehicle may be coupled at either end to a similar vehicle or to a towing tractor or tug.

Still more particularly, this invention relates to an improved and simplified automatic hitch assembly which may be automatically coupled to another hitch assembly upon interengagement of such assemblies and without requiring the attendance or participation of humans in the coupling activity. Furthermore, this invention specifically relates to a hitch assembly which is manually releasable to permit disengagement of two hitch assemblies from each other without further manual participation and which is thereafter automatically repositioned for subsequent automatic coupling.

With the automatic hitch assembly of the present invention, coupling of a tractor or tug and trailer, or two trailers, may be effected simply by moving the two vehicles to be coupled relative to each other to interengage the respective hitch assemblies thereof. Upon such interengagement, coupling is effected automatically without requiring human participation or the presence of a person between the vehicles being coupled. Uncoupling is readily and easily effected by manually disengaging coupling structure of the assemblies, with coupling elements of said structure being positively held in the disengaged position until the hitch assemblies are separated by moving the vehicles away from each other. Following such separation, the coupling mechanism of the hitch assembly automatically is returned to a condition in which it is ready to be recoupled in a subsequent operation as required.

From the foregoing, it should be understood that objects of the present invention include the provision of an improved and simplified vehicle hitch assembly; the provision of an improved vehicle, such as a trailer, carrying thereon an improved automatic hitch assembly; the provision of an improved double ended vehicle having a hitch assembly of the present invention at each of its opposite ends; the provision of an automatic coupling hitch assembly which requires no manual activity to effect coupling thereof with a similar hitch assembly; the provision of an improved hitch assembly which may be readily uncoupled and automatically positioned for recoupling thereafter; and the provision of an improved hitch assembly which may be automatically coupled with a similar assembly but which also is utilizable with a conventional coupling and tow arrangement.

With the foregoing objects in mind, reference is directed to the appended drawings for an illustration of a preferred embodiment of the subject invention.

DESCRIPTION OF THE PREFERRED EMBODIMENT

The subject invention has particular utility when utilized in conjunction with aircraft ground support equipment, such as baggage and cargo trailers and tractors or tugs for towing the same in a train. However, utility of the present hitch assembly in conjunction with other types of towable vehicles is recognized also. Hereinafter, reference is directed to a reversible or double ended ground support trailer for aircraft as illustrative of one exemplary type of vehicle with which the subject automatic hitch assembly is particularly well adapted for use.

Figures 1, 2:
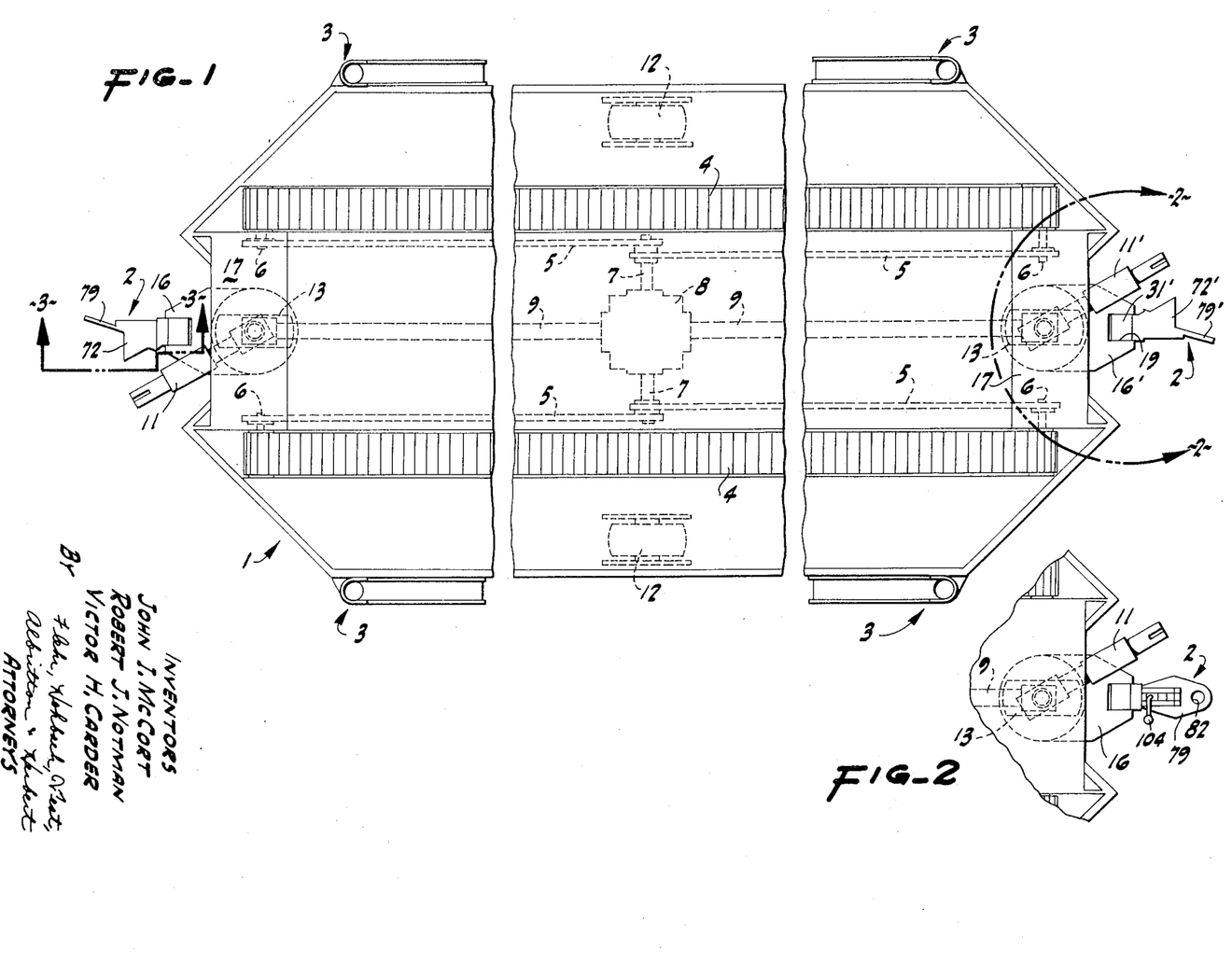
FIG. 1 is a plan view of an improved double ended trailer employing the present automatic hitch assembly at each of its opposite ends.
FIG. 2 is a partial plan view taken generally in the area defined by line 2—2 of FIG. 1 showing the subject hitch assembly reoriented to be engaged by a conventional tow arrangement.

Double ended trailers are particularly useful in conjunction with aircraft loading and unloading operations because of the capability of the same to be moved in either direction without turning around. Shown in FIG. 1 is such a double ended trailer, generally designated 1, having an automatic coupling hitch assembly of the present invention, generally designated 2, pivotally mounted at each of its opposite ends generally in line with its longitudinal axis. The trailer construction illustrated is of the side tow type which includes towing socket structures, generally designated 3, provided at each of its four corners. A preselected one of such side tow structures is to be engaged with cooperable towing mechanism provided on a tractor or tug which is operatively engageable therewith as described in greater detail in the copending application above identified.

It should be understood, however, that the automatic hitch assembly of this invention is usable with conventional front or rear tow trailer construction as well as the improved side tow construction illustrated in FIG. 1.

The trailer shown includes movable conveyor means thereon in the form of a pair of parallel articulated metal conveyor belts 4 mounted upon the trailer and forming part of the generally flat upper deck or bed thereof. The respective conveyor belts are driven by a series of drive chains 5 which pass over sprockets 6 mounted at opposite ends of the conveyor belt reaches, each of such chains being driven by drive shafts 7 rotatable at uniform speeds by a power source gear box 8 mounted generally centrally of the trailer beneath the bed thereof. The gear box in turn is coupled by means of longitudinally extending drive shafts 9 which at their opposite ends are operatively connected with drive coupling mechanisms 11 pivotally mounted at opposite ends of the trailer. The drive couplings 11 are to be connected with similar couplings of another trailer or of a tow tractor so that the conveyor belts on a given trailer may be actuated in unison with conveyor belts of other trailers in a train through the detachable drive couplings 11 illustrated.

As such drive couplings form no part of the present invention, their construction has not been illustrated or described in detail. However, it should be noted that the couplings 11 are pivotally mounted at opposite ends of the trailer in any suitable fashion so that the same do not interfere with a trailer train moving in other than a straight line. In FIG. 1 the couplings 11 are shown pivotal from the in-line position for purposes of clarity of illustration of the hitch assemblies positioned therebeneath.

Trailer 1 is supported for movement by a pair of wheel and pneumatic tire assemblies 12 mounted generally intermediate opposite ends thereof adjacent the opposite sides thereof. Additionally, a second pair of wheel and pneumatic tire assemblies 13 are located adjacent each of the opposite ends of the trailer between the opposite sides thereof. The wheel assemblies 13 are mounted generally in line with the longitudinal axis of the trailer and provide turning capability to the trailer from either end. In that connection, it should be understood that the automatic hitch assemblies 2 at the opposite trailer ends are operatively connected in any suitable fashion with the wheel assemblies 13 thereat so that the wheels are turned about a vertical axis in conjunction with pivotal movement of the hitch assemblies to impart turning capability to the trailer. Thus, upon a series of trailers being coupled together in a vehicle train, successive trailers in the train will track generally in the same path defined by the preceding trailer in the train.

Each hitch assembly of this invention is designed particularly to be interengaged with a hitch assembly of the same or essentially similar construction. For that purpose, the respective hitch assemblies are normally oriented in the position shown in FIGS. 1 and 4 when viewed from above. However, referring to FIGS. 2 and 12, it should be understood that each of the hitch assemblies is rotatable about its longitudinal axis through 90° to permit reorientation thereof to the position shown in FIGS. 2 and 12. When thus reoriented, the hitch assembly is adapted to receive therein a conventional tow hook 14 or equivalent structure receivable in an opening provided in a portion of the latch assembly as will be described. In that connection, it will be understood that such a conventional tow hook, which may be mounted on a towing tractor or on another trailer as part of its towing mechanism, can be inserted either from above or below into engagement with the hitch assembly. To facilitate such interengagement the hitch assembly, as will be described hereinafter, is pivotal about a horizontal axis. Normally, however, the hitch assembly is maintained in the automatic coupling orientation shown in FIGS. 1 and 4.

Figure 4:
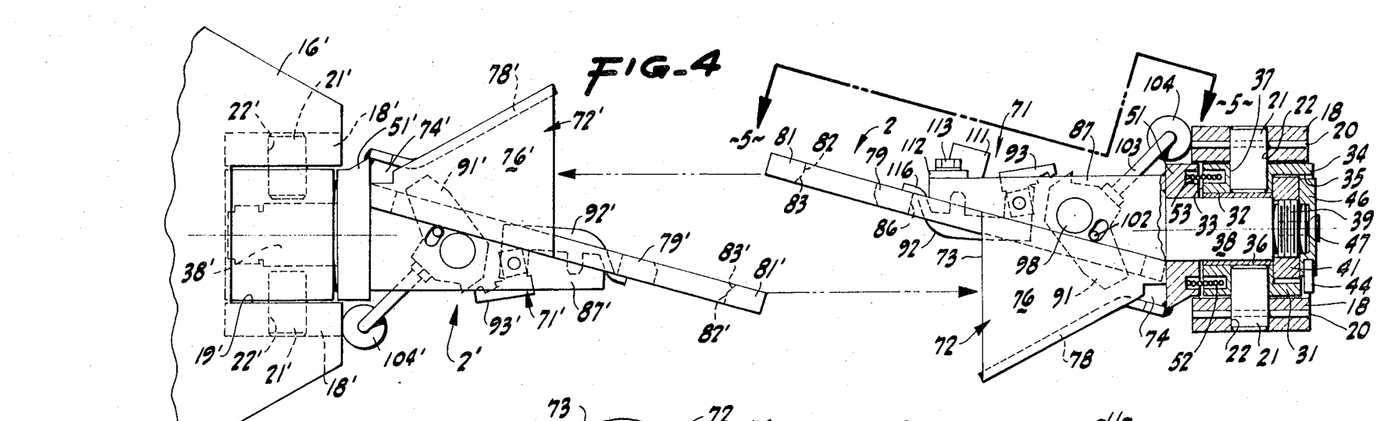
FIG. 4 is a plan view of two hitch assemblies embodying the present invention shown in a position ready to be coupled together.
Figure 12:
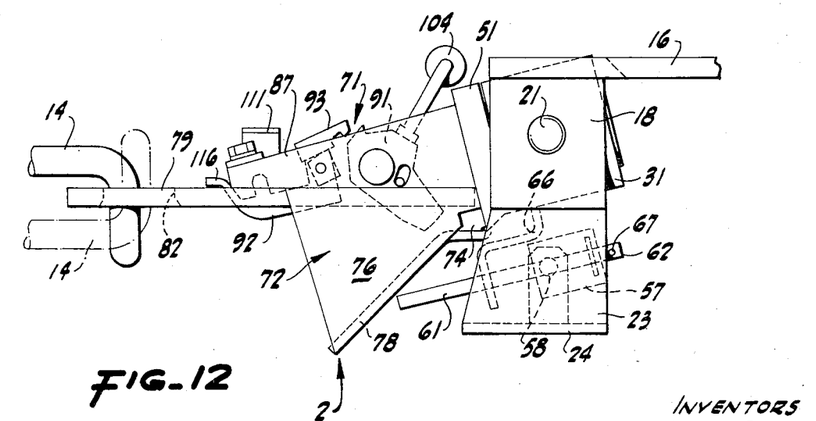
FIG. 12 is a side elevational view of the hitch assembly reoriented about its longitudinal axis to a position in which it is adapted to be engaged with a conventional tow hook construction.

It should be further understood that the hitch assembly is automatically returnable to its automatic coupling orientation shown in FIGS. 1 and 4 upon disengagement thereof from a conventional tow arrangement of the type seen in FIG. 12. The structure and mechanism for automatically returning and thereafter maintaining each hitch assembly in its automatic coupling orientation will be described hereinafter.

Details of the hitch assembly will now be described, taking principal reference to the assembly shown at the left of FIG. 1. However, the assembly shown at the right of FIG. 1 is identical and similar reference numerals primed are used to identify corresponding components.

Figure 3:
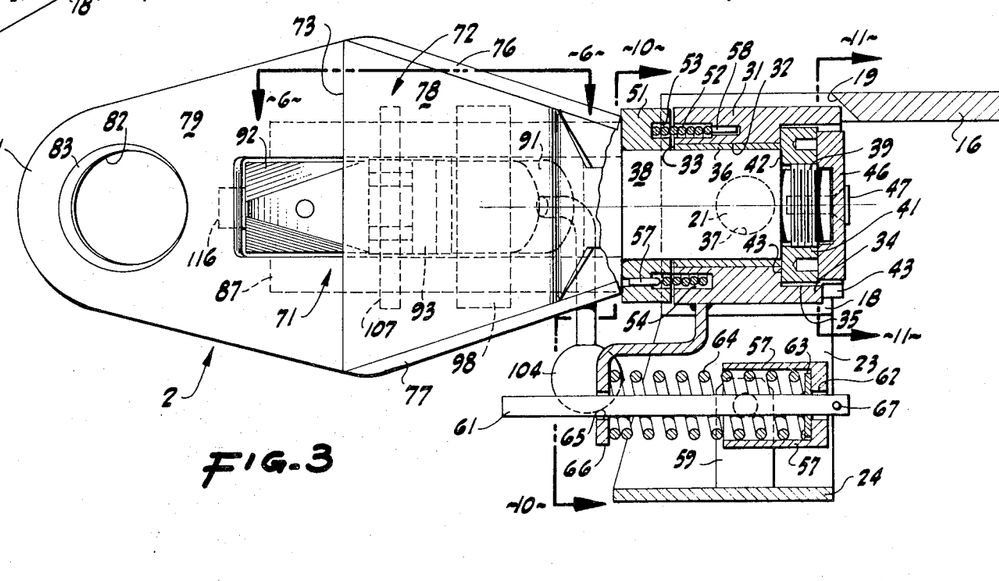
FIG. 3 is an elevational view of one side of the subject hitch assembly taken generally in the plane of line 3—3 of FIG. 1 on an enlarged scale relative thereto.

As perhaps best seen from FIGS. 1, 3 and 4, the hitch assembly is operatively mounted at an end of a trailer by means of a mounting plate 16 positioned beneath the chassis or framework of the trailer, such framework being defined partially by a flat structural member 17 interposed between the conveyors 4 and forming the bed thereof. The mounting plate 16 is operatively connected with a cooperable wheel assembly 13 through a suitable pivotal gearing mechanism as to be pivotal therewith. Thus, right or left pivotal movement of the hitch assembly about a vertical axis will produce attendant turning of the associated wheel assembly.

Figure 10:
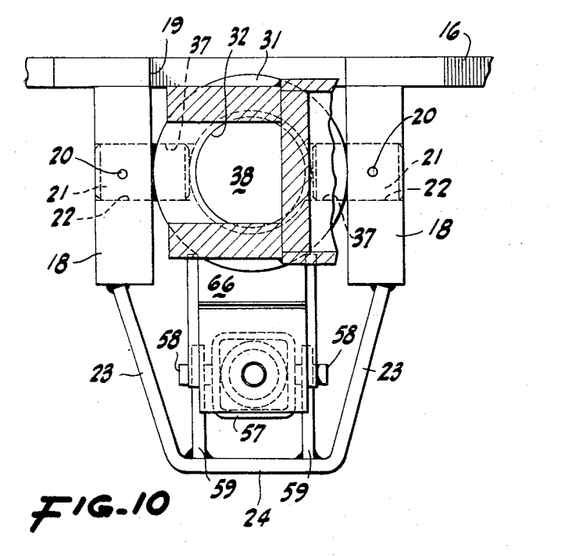
FIG. 10 is a vertical sectional view through the subject hitch assembly taken in the plane of line 10—10 of FIG. 3.

Depending from mounting plate 16, as best seen in FIG. 10, are a pair of parallel frame members 18 welded or otherwise suitably secured to the underside of the mounting plate. In that regard, as best seen in FIGS. 4 and 10, the mounting plate is provided with a generally rectangular cutout portion 19 at its end and the frame members 18 define opposite margins of the cutout. Up and down pivotal movement of the hitch assembly about a horizontal axis is permitted in the open space defined by the cutout. Such horizontal axis is defined by a pair of opposed aligned axles 21 received in apertures 22 formed in the frame members 18. As seen in FIG. 4, each of the axles is maintained in place by a suitable retainer pin 20 extending through the frame members 18 into and through the respective axles 21. Thus, the axles provide a horizontal pivotal axis for the entire hitch assembly to permit up and down pivotal movement of the hitch as required during coupling or uncoupling thereof and during travel of the trailer.

Depending from frame members 18 and secured thereto by welding or other suitable means is support structure comprising a bracket defined by converging arms 23 and a lower bight portion 24 formed from a flat plate bent into the generally V-shaped configuration best seen in FIG. 10. Such support structure provides means for mounting a mechanism provided to properly orient the hitch assembly in a generally horizontal position for automatic coupling as will be described hereafter.

Because of the substantial strains and shocks to which the subject hitch assembly is subjected during use, all components thereof are made of suitable high strength metals, such as steel or equivalent materials, known to be capable of withstanding such rough usage.

Operatively positioned between the frame members 18 is a pivotal hollow housing 31 which is generally cylindrical in outer configuration and which has a through bore 32 therein. At one end the housing is provided with a generally planar end face 33 and at its opposite end is provided with an extension 34 defined by an enlarged portion 35 of the through bore 32. Positioned in the bore 32 is a cylindrical bearing 36 provided for the well known purpose. One end of the housing is cut away as seen in FIG. 3 to permit pivotal movement thereof about axles 21 without interference from mounting plate 16.

Housing 31 has a pair of aligned bores 37 extending transversely of bore 32 and axles 21 are received within such bores 37 so that the housing 31 is pivotally mounted for up and down movement as before noted.

Received within housing 31 and rotatably positioned within bearing 36 therein is a hitch mounting shaft 38 which extends longitudinally of the hitch assembly and defines the longitudinal axis thereof. Shaft 38 has one end 39 thereof provided with threads with which a retainer nut 41 is engaged. Nut 41 engages a shoulder 42 provided inwardly of the shaft end, as well as the end of bearing 36 and an inner generally planar bearing surface 43 formed internally of housing 31 at the inner end of the enlarged bore extension 35 therein. A spanner wrench or like device can be utilized to position the nut 41 securely in place to hold the shaft 38 securely coupled to housing 31 while permitting rotation thereof about its axis.

Figure 11:
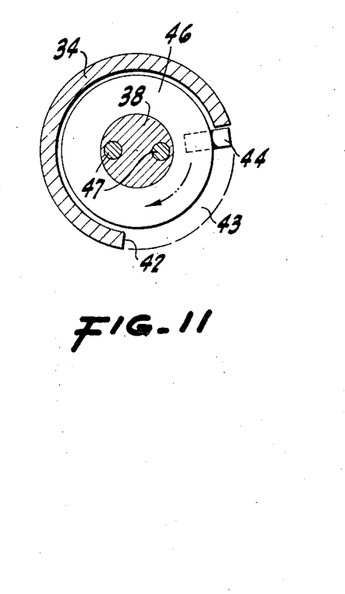
FIG. 11 is a vertical sectional view thru the assembly taken in the plane of line 11—11 of FIG. 3.

As seen in FIG. 11, the end portion of housing 31 defined by the extension 34 is peripherally recessed to provide stop means for limiting rotation of shaft 38 about its axis within predetermined limits. In that regard, the housing extension is provided with a cut away section 42 defined by an arcuate slot 43 as best seen in FIG. 11 which extends for approximately 105° about the axis of the housing. A limit pin 44 is positioned in slot 43 and is movable between the ends of the slot to restrict rotation of the shaft 38 within the housing between the limits established by the ends of the slot. To that end, a pin mounting disc 46 is secured by a pair of screw fasteners 47 to the outer end of shaft 38 so as to be rotatable with such shaft. Limit pin 44 is mounted in a radial bore formed in disc 46 and is rotatable with the disc and the shaft.

In the automatic coupling position of the hitch assembly shown in FIG. 1, the limit pin 44 is oriented as shown in FIG. 11. However, when the hitch assembly is rotated about 90° to the position shown in FIGS. 2 and 12 in which it is positioned to be engaged by a conventional tow structure, shaft 38 and pin 44 are rotated downwardly as seen in FIG. 11 until the pin contacts the opposite end of the slot 43. Thus, rotation of the shaft is restricted to approximately 90° between the limits established by the opposite extremities of the slot 43.

Means are provided for normally maintaining the housing 31, and thereby the entire hitch assembly, in the automatic coupling orientation shown in FIGS. 1 and 4. Such means includes a spring mechanism comprising an annular collar 51 positioned on and secured to shaft 38 by welding or other suitable fastening means. The collar is thus rotatable with the shaft relative to housing 31. Spring structure is provided in conjunction with the housing and collar, which is designed to rotate the shaft about its axis to the position shown in FIGS. 1, 4 and 11, which comprises a torsion spring 52 partially received within an annular groove 53 in the collar and partially received within an aligned annular groove 54 provided in the housing. Opposite ends 57 and 58 of the torsion spring 52 are received in axial extensions of the grooves to lock the spring in place so that it can exert torsional rotational forces on the shaft 38 through collar 51 to normally maintain the shaft, and accordingly the remainder of the hitch assembly, in the automatic coupling orientation shown in FIGS. 1 and 4.

Means for maintaining the hitch assembly in the orientation ready for automatic coupling also includes additional spring mechanism designed to maintain the axis of shaft 38 generally in a horizontal plane as perhaps best seen in FIG. 3. Such spring mechanism includes a hollow casing 57 pivotally mounted by opposed pivot pins 58 which extend through a pair of mounting arms 59 welded or otherwise suitably secured to the bight portion 24 of the aforementioned support bracket which depends from the frame members 18 as best seen in FIGS. 3 and 10. An elongated pin 61 is positioned in casing 57 and extends through an aperture 62 provided in one end thereof. A travel limiting stop washer 63 is tack welded or otherwise secured to the pin 61 adjacent one thereof, such washer being positioned within the casing as seen in FIG. 3.

Spring structure is positioned to surround pin 61 and comprises a coil spring 64 having one end thereof abutting washer 63 and the other end abutting a portion of a generally S-shaped angle bracket 66 having an opening 65 therein through which the opposite end of pin 61 extends as also seen in FIG. 3. At its upper end, angle bracket 66 is secured by welding or the like to the undersurface of housing 31. Pin 61 is retained in the casing by a cotter key or split retainer 67 positioned exteriorly of the casing as seen in FIG. 3.

The strength of coil spring 64 is such that it cooperates with bracket 66 through engagement with pin 61 to normally maintain the axis of shaft 38 in the generally horizontal position seen in FIG. 3. However, upward or downward pivotal movement of the hitch assembly about the axes of aforementioned axles 21 is possible with pin 61 moving correspondingly through opening 65 of bracket 66 as required during such movement. Casing 57 will be correspondingly pivoted about the axes of its pivot pins 58 in the fashion seen, for example, in FIG. 12. During such pivoting the coil spring 64 is compressible or expansible along the axis of pin 61 as required.

Thus, it will be understood that, through the provision of the torsion spring 52 and the coil spring 64, the hitch assembly is normally maintained in the automatic coupling orientation shown in FIGS. 1 and 4 for receipt therein of another hitch assembly during automatic coupling of such hitch assemblies. Furthermore, when the hitch assembly is rotated about the longitudinal axis of shaft 38 to the position shown in FIGS. 2 and 12, the torsion spring is distorted and the coil spring 64 is compressed so that the hitch assembly may be oriented as seen in FIG. 12 to adapt the same to be engaged by a conventional tow arrangement. However, upon disengagement of the conventional tow arrangement the torsion spring and coil spring return the hitch assembly to the automatic coupling orientation automatically and without further special attention.

The hitch assembly further includes coupling or latching mechanism generally designated 71 which is interengagable with a hitch to be coupled therewith. Such latching mechanism is operatively mounted on an open housing 72 of generally pyramidal or funnel shaped configuration having an open enlarged end 73 defined by four opposed walls which taper progressively inwardly towards collar 51 secured to the shaft 38 as mentioned previously. The tapered housing defines a guide channel adapted to receive therein a portion of a hitch to be coupled with the subject hitch assembly. Desirably such other hitch will correspond with the hitch of this invention as disclosed herein but it should be understood that other hitch constructions of suitable configuration also may be interconnected with the hitch of this invention.

At the end opposite its open end, housing 72 is provided with a slot or opening 74 into which at least a portion of the hitch to be coupled with the subject hitch assembly is receivable. While housing 72 may be formed in various manners, in a preferred embodiment it is fabricated from four plate members 76, 77, 78 and 79 as perhaps best seen in FIGS. 3 and 4. The plates 76, 77 and 78 are generally imperforate and define three generally coextensive sides of the housing. The fourth plate member 79, in addition to defining a fourth side of the housing, provides a rigid elongated coupling tongue including an apertured extension 81 which projects beyond the confines of the open end of the guide channel of the housing. Such coupling tongue has adjacent one of its ends a circular aperture 82 which is beveled or countersunk at the inner surface thereof facing the guide channel as seen in FIGS. 3 and 4. Such countersunk construction insures effective interengagement of the latching mechanism of the hitch assembly with a similar mechanism of the hitch assembly interengaged therewith as will be described.

It should be understood that housing 72 is integrally connected by welding or other suitable means to the collar 51 which in turn is positively secured to the shaft 38 of the hitch assembly as described previously.

The tongue forming plate 79 has an elongated generally rectangular slot 86 provided centrally therein through which certain portions of the latching structure are selectively projectable during utilization of the hitch assembly. An open casing 87 is secured to the outer surface of tongue plate 79 by welding or the like as seen best from FIG. 5. Such casing is defined by two generally parallel mounting plates between which the mechanism of the latching structure is operatively positioned.

Such latching mechanism comprises three principal components, namely a pivotal coupling detent member 91, a pivotal detent release member 92 and a pivotal latch member 93. As seen from FIGS. 4 and 6, in the uncoupled position the coupling detent 91 and release member 92 project through the slot 86 beyond the inner face of the tongue plate 79. Positioned between the arms of the open housing 87 is a stop member 96 against which is abutted one end of a coil spring 97, the opposite end of which is received in a shallow recess 98 formed adjacent one end of the coupling detent 91.

Coupling detent 91 is pivotally mounted between the arms of housing 87 on a headed pivot pin 98 (FIG. 5) retained in place by a cotter pin 99 or the like. The coupling detent 91 is pivotal about the axis of pin 98 between limits defined by a slot 101 formed in the detent in which a stop pin 102 is received. The stop pin is mounted upon the walls of casing 87 in any suitable fashion to project into slot 101 in the coupling detent.

Threadedly secured to the coupling detent is means for manually retracting the coupling detent comprising a handle 103 having a graspable knob 104 at its end. When it is desired to retract the coupling detent within the confines of the slot 86 in the tongue plate 79 against the urging of spring 97, handle 104 is grasped and the detent pivoted about the axis of pin 98 to the retracted position shown in FIG. 9.

Figure 5:
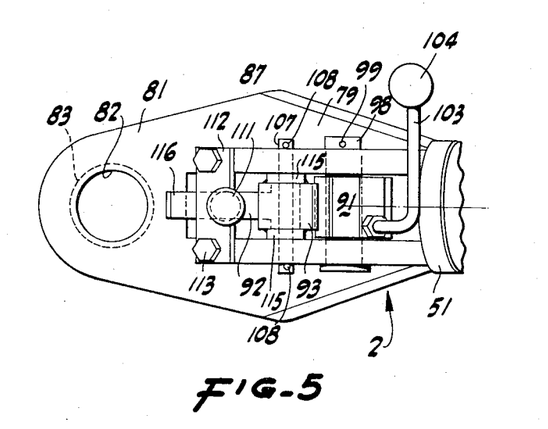
FIG. 5 is an elevational view of the other side of the assembly taken generally in the plane of line 5—5 of FIG. 4.
Figure 9:
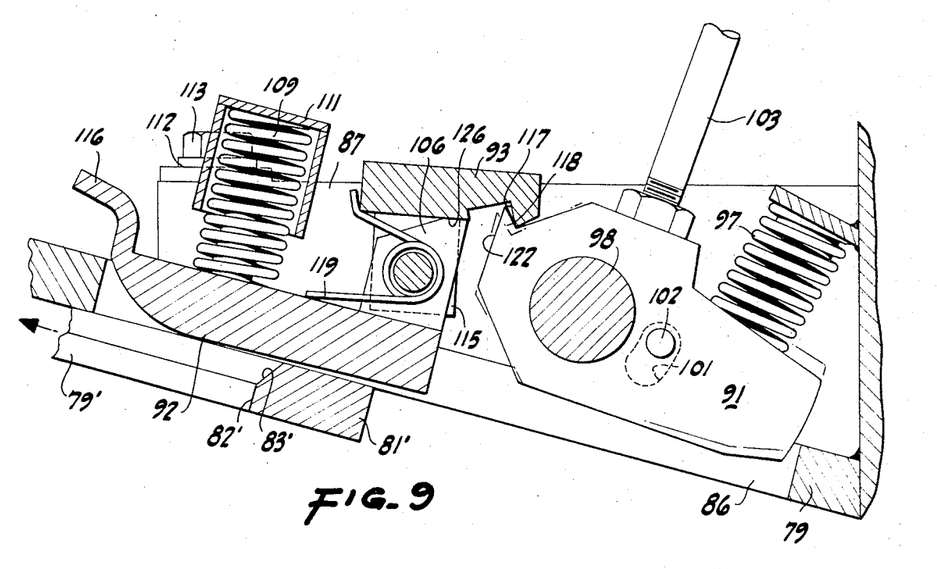

The release member 92 is provided with a mounting ear 106 which is positioned around a second pivot pin 107 held in place in housing 87 by cotter keys 108 or the like extended through each of its opposite ends as seen in FIG. 5. The release member 92 is normally urged to its extended position shown in FIGS. 4 and 6 by a coil spring 109 which is received within a spring retainer 111 welded to a retainer plate 112 secured by bolts 113 to the outer surface of housing 87 as best seen in FIGS. 5 and 9. A spring retainer pin 114 is positioned in a recess formed in the release member 92 to prevent disengagement of spring 109 from the release member and retainer 111 as best seen in FIG. 9. Outward pivotal movement of release member 92 under the urging of spring 109 is restricted by means of a projecting stop tab 116 formed integral with the release member which is adapted to engage the outer surface of the tongue plate 79 in the manner seen in FIG. 6.

Latch member 93 is also pivotally mounted on the pivot pin 107 by means of spaced ears 115 as seen in FIG. 5. The latch is mounted on opposite sides of ear 106 of the release member 92 and is pivotal between predetermined positions. The function of the latch is to selectively maintain coupling detent 91 in a retracted position when it is desired to uncouple a hitch assembly from another hitch. To that end, latch 93 is provided with a transverse slot 117 designed to receive therein a projecting tapered tip 118 formed on one end of the coupling detent.

Figure 6:
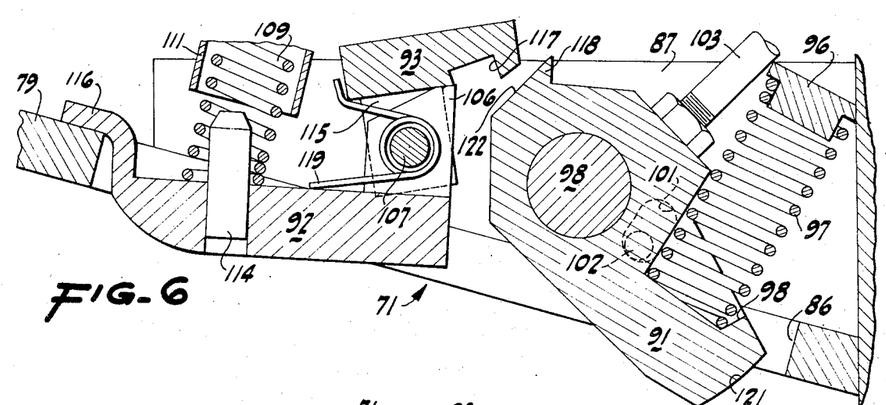
FIGS. 6 through 9 are horizontal sectional views taken generally in the plane of line 6—6 of FIG. 3 and illustrating the latching structure of the hitch assembly during various stages of a coupling and uncoupling operation.
Figures 7, 8:
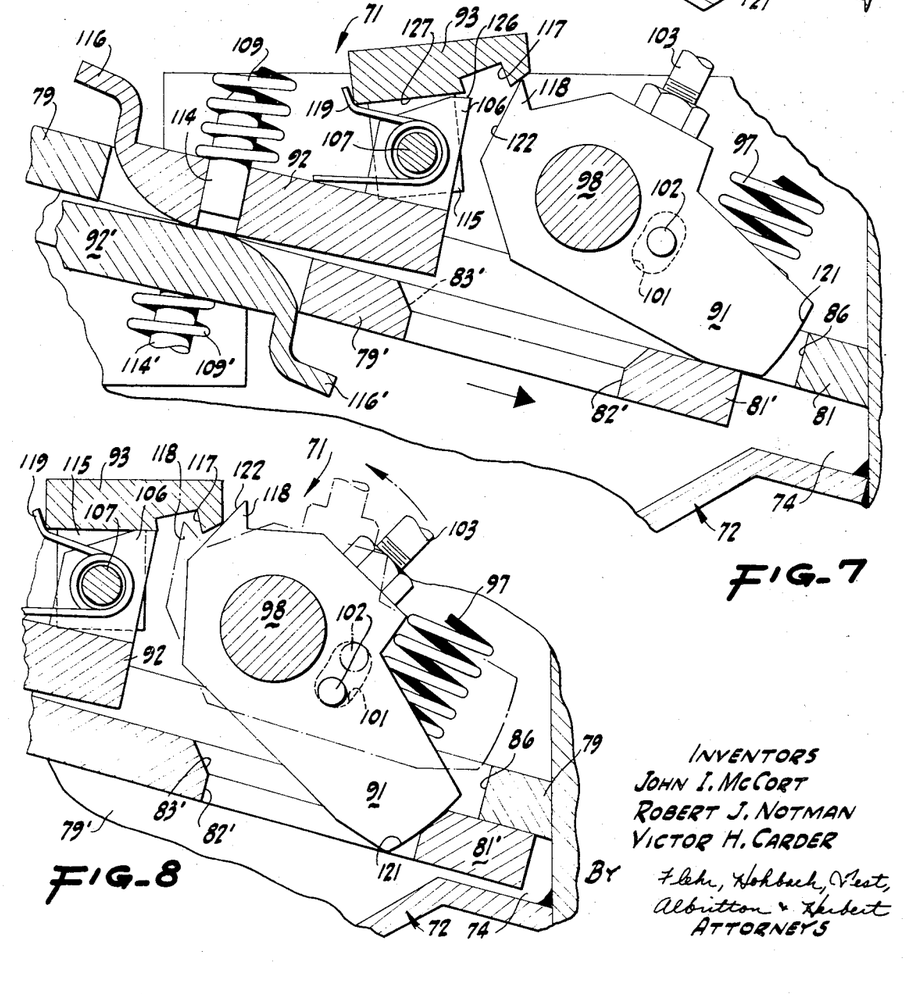

The latch is normally urged to a position in which it is adapted to receive the tip of the coupling detent therein by a torsion spring 119 positioned around pivot pin 107 and interposed between the release member 92 and the latch as best seen in FIGS. 6 and 7. Torsion spring 119 normally urges the latch in a clockwise direction as viewed in those figures for the purpose to be described.

The hitch mechanism functions as follows, referring to FIG. 4, taken in conjunction with FIGS. 6 through 9. With the hitch assembly oriented for automatic coupling in the position shown in FIG. 4, another hitch assembly on an adjacent end of another vehicle, such as a similarly constructed trailer or a tractor, may be moved relative to the hitch assembly in the fashion shown in FIG. 4. Such relative movement will bring a tongue plate 79' of the other hitch into the guide channel defined by the housing 72 of the subject hitch assembly. Such relative movement will also introduce the tongue plate 79 of the subject hitch assembly into the guide channel defined by the housing 72' of the other hitch assembly. Following such relative movement and introduction of the tongues of the respective hitch assemblies into the respective tapered guide channels thereof, the housings 72 and 72' of the respective assemblies may pivot in horizontal and vertical planes, by bringing into play the spring mechanisms described previously, to the extent necessary to permit full insertion of the respective tongues into the respective guide channels until the ends 81 and 81' of the respective tongues are positioned within the respective slotted ends 74 and 74' of the hitch assemblies.

Such positioning results in the respective tongues depressing the respective release members 92 and 92' of the respective latching mechanisms in the manner seen in FIG. 7. Continued insertion of the end 81' of one hitch assembly into the slotted opening 74 of the other results in temporary depression of the coupling detent 91 within the confines of slot 86 in the tongue plate 79 thereof as also seen in FIG. 7. However upon continued insertion of the tongue end 81' into the slotted end 74, coupling detent 91 is subsequently extended by its associated spring 97 into the aperture 82' of the associated tongue plate 79' in the manner seen in FIG. 8. When thus extended, the coupling detent positively precludes separation of tongue plate 79' from the housing 72 of the subject hitch assembly. To that end, it will be noted that the end of the coupling detent, identified by reference numeral 121 in FIG. 8, is contoured to conform closely with the countersunk configuration 83' of the aperture 82' so that a secure surface to surface interengagement is effected as best seen in FIG. 8.

It should also be understood that the end 81 of tongue plate 79 will be similarly securely and automatically engaged with the coupling detent 91' of the other hitch assembly during interengagement of the two hitch assemblies.

During such coupled interengagement of the two hitch assemblies, two trailers, or a tractor and trailer, thus interengaged are securely interconnected and may be moved about at rapid rates of speed without fear of accidental disengagement and with minimum play or movement therebetween. During such interengagement the respective release members 92 and 92' are maintained in the retracted position by the respective tongue plates of the hitch assemblies as seen in FIG. 7.

When it is desired to uncouple the interconnected hitch assemblies to permit separation of the vehicles, it is merely necessary to grasp the handles 104 and 104' of the respective hitch assemblies to retract the respective coupling detents 91 and 91' from engagement with the apertures in the tongues 79 and 79'. The latches 93 and 93' of the respective hitch assemblies are provided to maintain the coupling detents 91 and 91' retracted so that vehicle uncoupling may be effected.

Referring to FIGS. 8 and 9, the function of each latch is illustrated referring to coupling detent 91. If handle 104 is moved sufficiently far in a counterclockwise direction as viewed in FIGS. 8 and 9, the tip 118 of detent 91 may be positioned in slot 117 in the latch 93. To facilitate such interengagement, detent 91 is provided with the tapered surface 122 which permits the end of the latch 93 to ride thereover. By overtraveling the coupling detent 91 in a counterclockwise direction as seen in dotted lines in FIG. 8, the detent may be positioned to have its tip 118 received in slot 117 of the latch. During such overtravel, the torsion spring 119 of the latch is compressed to permit the latch to pivot counterclockwise during contact of surface 122 of the detent therewith. When the tip is positioned as shown in dotted lines in FIG. 8, the torsion spring 119 returns the latch in a clockwise direction to the latching position shown in FIG. 9.

It should be understood that engagement of the latch 93 and the tip 118 of the coupling detent 91 is not effected unless the coupling detent is forced to overtravel in the manner seen in FIG. 8. That is, referring to FIG. 7, during interengagement of two tongues of cooperable hitch assemblies, each coupling detent is moved by an associated tongue only a limited distance sufficient to retract it within the confines of the slot 86 in the tongue. Such retraction does not rotate the detent a distance sufficient to cause the tip 118 to be engaged within the slot 117 of the latch so that no interengagement exist therebetween. The detent may automatically be engaged with the latching aperture in the tongue of a cooperable hitch assembly as seen in FIG. 8 without interference from the latch.

Once the coupling detent 91 has been retracted by handle 104 to engage the latch 93, the detent is free of holding engagement with the tongue plate 79' of the other hitch assembly and such tongue plate may be withdrawn therefrom. Upon tongue plate 79' clearing the release member 92 the spring 109 which urges the release member toward its extended position overcomes the effectiveness of the interengagement between the tip 118 of the coupling detent and the slot 117 of the latch so that the latch is pivoted counterclockwise when viewed in FIG. 9 to free the coupling detent from engagement therewith. Upon such disengagement of the coupling detent and latch, spring 97 urges the coupling detent to its extended position seen in FIG. 6 in which it is ready to subsequently receive a tongue of another hitch assembly when automatic recoupling is desired.

To insure movement of latch 93 is the counterclockwise direction to free the coupling detent therefrom, the ear 106 of the release member is provided with a generally flat camming surface 126 (note FIG. 7) which is normally engaged face to face with a generally flat under surface 127 on the latch 93 in the manner seen in FIG. 8. Thus, when release member 92 is urged outwardly by its spring 109, the urging effect of camming surface 126 on surface 127 of the latch overcomes the urging of torsion spring 119 on the latch to pivot the latch counterclockwise to free the coupling detent. Furthermore, disengagement of the coupling detent and the latch is facilitated by tapering the surface of the tip 118 of the detent and the wall of the slot so that limited surface to surface contact therebetween exists as seen in FIG. 9.

While the hitch assembly of this invention is particularly well adapted for utilization with another hitch assembly corresponding in construction thereto, it should be understood that the same is utilizable to couple therewith a hitch of another vehicle so long as such other hitch includes a generally flat tongue plate having an apertured recess therein of the type corresponding to plate 79 and aperture 82.

Having thus made a full disclosure of a preferred embodiment of this invention, attention is directed to the appended claims for the scope of protection to be afforded thereto.

We claim:

1. An automatic vehicle hitch assembly to be mounted on a vehicle for use in automatically coupling such vehicle with an apertured tongue on another vehicle: said hitch assembly comprising a generally funnel shaped housing which converges in cross sectional size from an outer open end thereof toward a restricted inner end thereof to facilitate insertion of said tongue of said other vehicle therein, said housing defining a guide channel to receive therein said tongue of said other vehicle, said guide channel terminating in a slotted opening into which said tongue projects when in coupling relationship with said hitch assembly: and automatic coupling mechanism mounted on a wall of said housing comprising; a spring urged pivotal coupling detent normally projecting into said slotted opening from said wall of said housing adjacent said inner end thereof, said coupling detent being automatically engageable with an aperture in said tongue when said tongue enters said slotted opening to effect coupling of said tongue with said hitch assembly, said coupling detent being selectively retractable into said housing wall when said tongue comes in contact therewith during automatic coupling and when uncoupling of said tongue from said hitch assembly is desired; handle means operatively connected with said coupling detent for effecting selective retraction thereof relative to said housing wall when uncoupling of said tongue is desired; a spring urged pivotal latch member selectively and automatically engageable with said coupling detent when said detent is retracted by said handle means, said latch member positively holding said detent in the retracted position until said tongue clears said detent during uncoupling of said tongue from said housing; and a spring urged pivotal release member normally projecting into the path of movement of said tongue adjacent the outer end of said housing, said release member being held retracted by said tongue when said tongue is engaged with said coupling detent, said release member being effective to overcome the holding effects of said latch member when said tongue clears said release member so that said coupling detent may automatically return to its normal position to adapt said hitch assembly for subsequent automatic coupling with another tongue.

2. The hitch assembly of claim 1 in which said housing includes an apertured extension projecting from said wall thereof substantially as a coplanar continuation of such wall, said extension defining a tongue and having an aperture therein which is engageable with a coupling detent of another hitch assembly.

3. The hitch assembly of claim 1 which includes means for mounting said assembly on the framework of said vehicle with said housing wall normally oriented generally in a vertical plane for automatic coupling with said tongue.

4. The hitch assembly of claim 3 which includes spring means for normally retaining said housing in an automatic coupling orientation in which said housing wall is generally vertically positioned and in which the longitudinal axis of said housing is maintained generally horizontal.

5. The hitch assembly of claim 1 which further includes means pivotally connecting said assembly with the framework of said vehicle for pivotal movement about vertical and horizontal axes relative thereto.

6. The automatic hitch assembly of claim 5 in which said pivotal connecting means includes structure mounting said housing normally in a generally horizontal orientation to facilitate reception of said tongue therein.

7. In combination with said hitch assembly of claim 1, another hitch assembly substantially identical thereto mounted on another vehicle to be coupled with said first mentioned vehicle by said hitch assemblies.

8. The hitch assembly of claim 1 which further includes a spring normally urging said release member towards its extended position, said release member also urging said latch member toward a position in which said release member is free of said latch when said tongue is withdrawn from said housing.

9. The hitch assembly of claim 1 which includes means mounting said housing for pivotal movement includes a mounting shaft secured to said tapered guide housing, a generally cylindrical mounting housing having a bore in which said shaft is rotatably positioned, structure retaining said shaft in said bore, axle structure pivotally mounting said mounting housing for up and down pivotal movement relative to the framework of said vehicle, and limit structure operatively interposed between said shaft and said mounting housing for restricting rotation of said shaft about its longitudinal axis within predetermined limits.

10. The hitch assembly of claim 9 which further includes an apertured extension projecting from said wall of said tapered guide housing substantially as a coplanar extension thereof, said extension normally being retained in a generally vertical plane by said spring means; said tapered housing being rotatable about the longitudinal axis of said shaft to orient said extension generally in a horizontal plane to permit connection of said hitch assembly with a tow hook or like structure of a conventional towing construction.

11. The automatic hitch assembly of claim 1 which further includes means for mounting said housing on said vehicle with said slotted opening of said housing normally extending in a generally vertical plane to receive said tongue therein when the plane of said tongue is generally vertically oriented.

* * * * *